United States Patent [19]

Tanaka

[11] Patent Number: 4,532,463
[45] Date of Patent: Jul. 30, 1985

[54] METHOD AND APPARATUS FOR ADJUSTING OPERATION TIME OF SERVOSYSTEM

[75] Inventor: Hidetake Tanaka, Tokyo, Japan
[73] Assignee: Ricoh Company, Ltd., Tokyo, Japan
[21] Appl. No.: 461,094
[22] Filed: Jan. 26, 1983
[51] Int. Cl.$^3$ .................................................. G05B 5/01
[52] U.S. Cl. .................................... 318/616; 318/571; 318/702
[58] Field of Search ........................ 318/571, 616, 702; 400/144.2; 364/174

[56] References Cited

U.S. PATENT DOCUMENTS 4,156,169  5/1979  Imamura ............................. 318/616
4,218,735  8/1980  McCutcheon ...................... 364/118

Primary Examiner—William M. Shoop
Assistant Examiner—Saul M. Bergmann
Attorney, Agent, or Firm—David G. Alexander

[57] ABSTRACT

A method and apparatus for automatically adjusting an operation time of a servosystem into a predetermined allowable range, either from the outside or from the inside. An average operation time of the servosystem is calculated and then an amount of level shift is calculated from the resulting average operation time. Based on the resulting level shift, the operation time of the servosystem is stepwisely shifted at a given time interval. After the shift, an average operation time of the servosystem is calculated again. This is repeated until the average operation time enters the allowable range.

17 Claims, 21 Drawing Figures

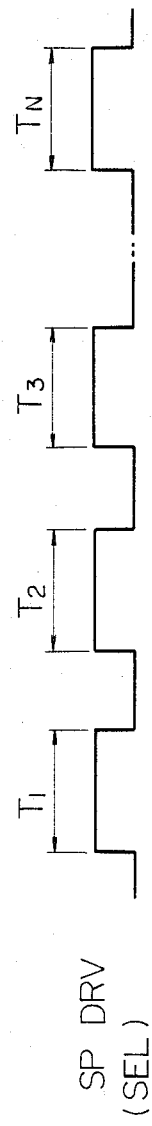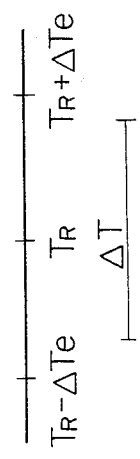
Fig. 9
Fig. 10

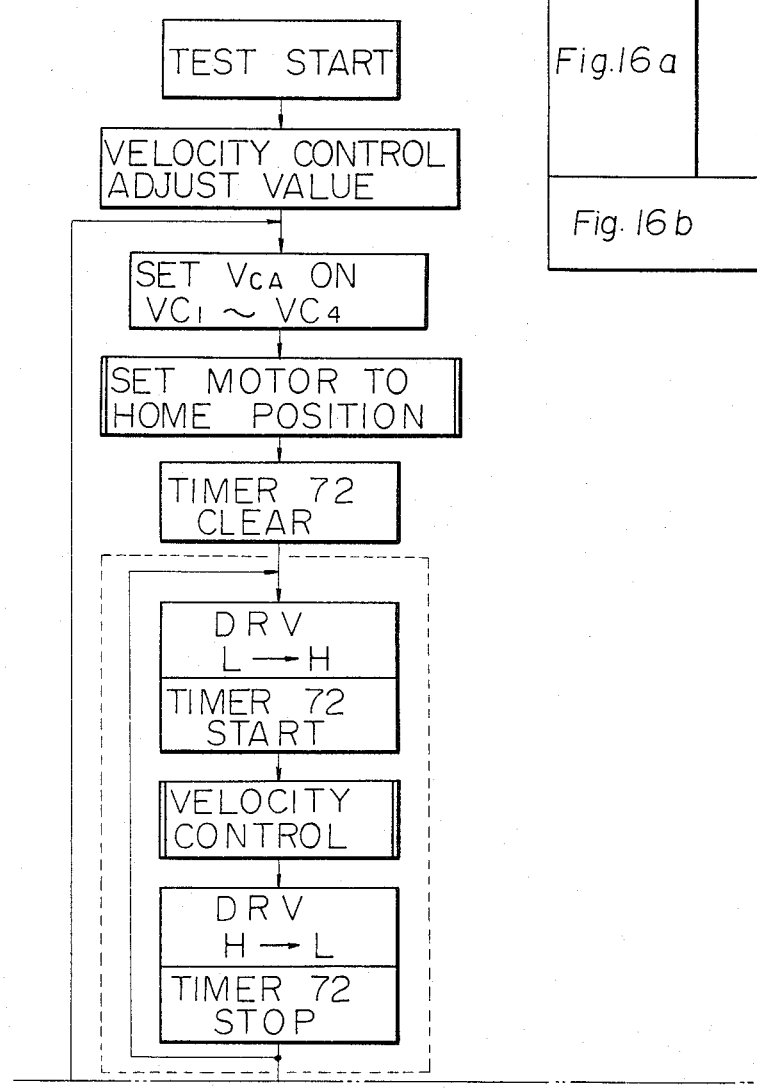

4,532,463

METHOD AND APPARATUS FOR ADJUSTING OPERATION TIME OF SERVOSYSTEM

BACKGROUND OF THE INVENTION

The present invention relates to an improvement in a method and apparatus for adjusting the operation time of a servosystem and, more particularly, to a device which is capable of readily adjusting the rotation speed of a servomoter.

Where a servomotor is used to drive a carriage of a printer or like load, its rotation speed is susceptive to various inaccuracy factors which may be typified by the friction torque of a mechanism associated with the load, torque constant of the servomotor, constants in a printed circuit board (PCB) and offset of an operational amplifier. Any fluctuation in the rotation speed of the servomotor would lead to various troubles such as an inaccurate printing speed of a printer and inaccurate stop characteristics of the servomotor.

A prior art expedient for the adjustment of the velocity of a servomotor has employed a variable resistor (volume) or a set of switches which are selectively opened and closed. The apparatus relying on a variable resistor, however, suffers from the drawback that one has to operate the variable resistor while constantly measuring the motor speed. Another drawback is that one cannot quickly re-adjust the motor speed unless manipulating the variable resistor at each time of maintenance. Meanwhile, the apparatus using a set of switches has to be furnished with a number of resistors and switches in one to one correspondence with minutely divided adjustment steps, which will be essential in this case for stabilizing the printing speed of a printer or the stop characteristics of a servomotor. This results in a bulky design of the apparatus due to the substantial area occupied by such elements on a printed circuit board, while increasing the cost to a disproportionate degree.

SUMMARY OF THE INVENTION

In one aspect of the present invention, a method of adjusting an operating time of a servosystem into a predetermined allowable range is provided. The servomotor is driven according to a predetermined pattern. An average operation time of the servosystem is calculated and then an amount of level shift based on the resulting average operation time. The operation time of the servosystem is shifted stepwisely at a given time interval, based on the resulting amount of level shift. An average operation time of the servosystem is re-calculated after the shift. The calculation of an average operation time is repeated until the average operation time is brought into the allowable range.

In accordance with another aspect of the present invention, an apparatus for adjusting an operation time of a servosystem into a predetermined allowable range is provided. The apparatus includes means for calculating an average operation time of the servosystem, means for calculating an amount of level shift from the resulting average operation time, means for stepwisely shifting the operation time of the servosystem at a given time interval, based on the resulting amount of level shift, and means for re-calculating an average operation time after the shift. This controls the average operation time until it enters the allowable range.

In accordance with another aspect of the present invention, an apparatus for adjusting a velocity of a servomotor in a printer into a predetermined allowable range is provided. The apparatus includes means for shifting a velocity of the servomotor stepwisely at a given predetermined interval, means for driving the servomotor according to a predetermined running pattern, means for instructing the shifting means to stepwisely shift the velocity level, means for commanding the printer to start and stop the running pattern, and means for detecting an average velocity of the servomotor.

It is an object of the present invention to provide an operation time adjusting apparatus for a servosystem which permits the operation time of a servosystem to be automatically adjusted from the outside.

It is another object of the present invention to provide an operation time adjusting apparatus for a servosystem which allows a device with a servosystem to automatically adjust the operation time by assigning the adjusting function to the device itself.

It is another object of the present invention to provide a generally improved method and apparatus for adjusting the operation time of a servosystem.

Other objects, together with the foregoing, are attained in the embodiments described in the following description and illustrated in the accompanying drawings.

BRIEF DESCRIPTION OF THE DRAWINGS

FIG. 9 is a timing chart showing an operation of a servomotor;

FIG. 10 is a diagram indicating the relationship between an allowable operation time range and an amount of shift per level;

FIGS. 13a, 13b–15 are block diagrams of another embodiment of the present invention;

FIGS. 16a and 16b are flowcharts representing operations of the apparatus shown in FIGS. 13–15.

DESCRIPTION OF THE PREFERRED EMBODIMENTS

While the method and apparatus for adjusting operation time of a servosystem of the present invention is susceptible of numerous physical embodiments, depending upon the environment and requirements of use, substantial numbers of the herein shown and described embodiments have been made, tested and used, and all have performed in an eminently satisfactory manner.

Figure 1A:
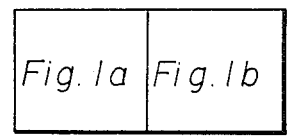
FIGS. 1a and 1b are block diagrams showing an exemplary servomotor and its associated control device to which an apparatus of the present invention (external checker) is applicable.
Figure 1A:
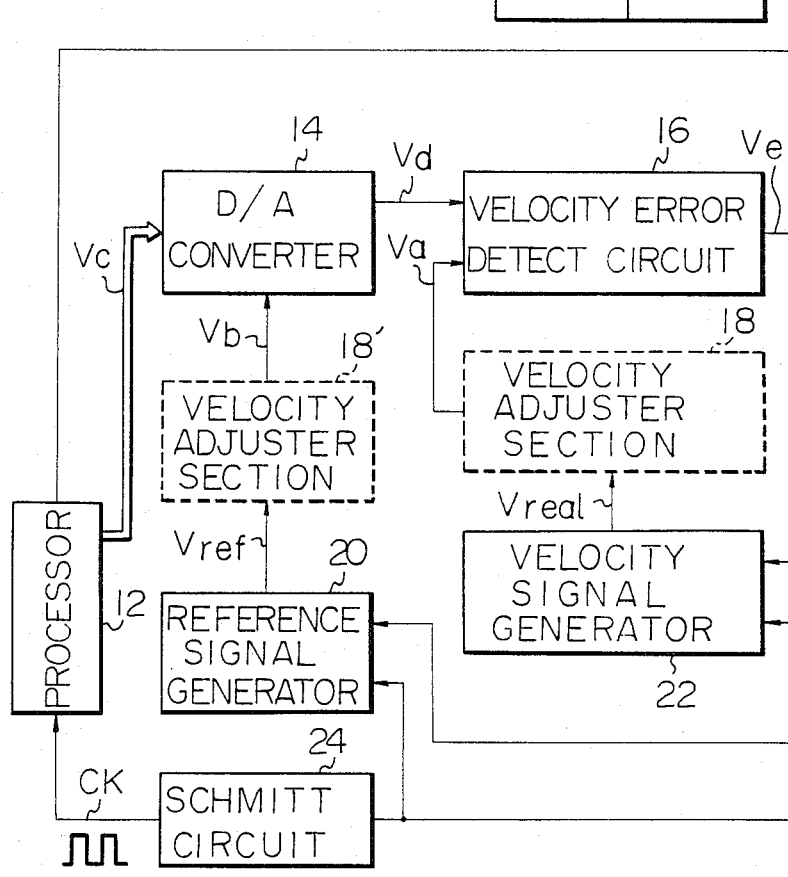
Figure 1B:
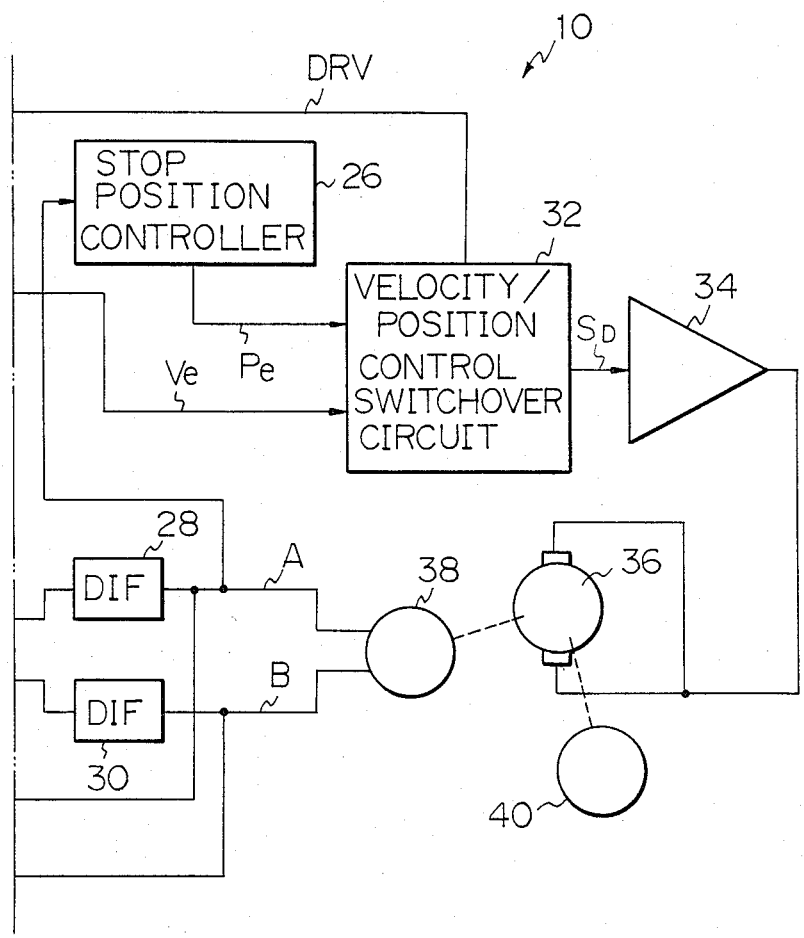

Referring to FIG. 1 of the drawings, a servomotor and a control system therefor to which the present invention is applicable is shown and generally designated by the reference numeral 10. The control system includes a processor 12, a digital-to-analog or D/A converter 14, a velocity error detect circuit 16, velocity adjuster sections 18 and 18' and a reference signal generator 20. Also included in the control system are a velocity signal generator 22, a Schmitt trigger circuit 24, a stop position controller 26, differentiators 28 and 30, a velocity/position control switchover circuit 32, and a motor driver 34. Designated by the reference numeral 36 is a servomotor, 38 an encoder and 40 a load which is driven by the servomotor 36.

The encoder 38 is directly or indirectly connected with the servomotor 36 in order to generate two different position signals A and B, which have phases shifted from each other by 90° in accordance with the angular movement of the servomotor 36. The position signals A and B are coupled to the differentiators 28 and 30, respectively. The outputs of the differentiators 28 and 30 are commonly fed to the velocity signal generator 22 which then rectifies and adds them to prepare a velocity signal Vreal. At the same time, the position signals A and B are delivered to the reference signal generator 20 which is adapted to generate a reference signal Vref based on an amplitude of the signals A and B.

The output signal Vreal of the velocity signal generator 22 is fed to the velocity adjuster 18 to be thereby regulated to a desired value. Likewise, the output signal Vref of the reference signal generator 20 is fed to the velocity adjuster 18' to be regulated into a desired value. The output signals Va and Vb of the velocity adjusters 18 and 18' are coupled to the velocity error detector 16 and the D/A converter 14, respectively. The position signal B is supplied also to the Schmitt trigger circuit 24. The processor 12, monitoring the position clock CK output from the Schmitt trigger circuit 24, supplies the D/A converter 14 with a velocity instruction level signal Vc which conforms to a distance travelled by the motor 36. The D/A converter 14 in turn supplies the velocity error detector 16 with a velocity instruction signal Vd in accordance with the velocity instruction level signal Vc.

The velocity error detector 16 compares the output Vd of the D/A converter 14 with the output Va of the velocity signal generator 22, delivering a velocity error signal Ve to the velocity/position control switchover 32. In response to a command DRV from the processor 12, the velocity/position control switchover 32 selects either one of the velocity error signal Ve and a position error signal Pe output from the stop position control 26. The output SD of the switchover 32 is power-amplified by the motor drive 34, thereby driving the motor 36.

The processor 12 commands a velocity control up to a point near the end of a desired distance of movement of the motor 36. As the specific point mentioned is reached by the motor 36, the processor 12 commands a stop position control this time. Such a procedure allows the servomotor 36 to stop its movement after travelling the desired distance stably and accurately.

Figure 2:
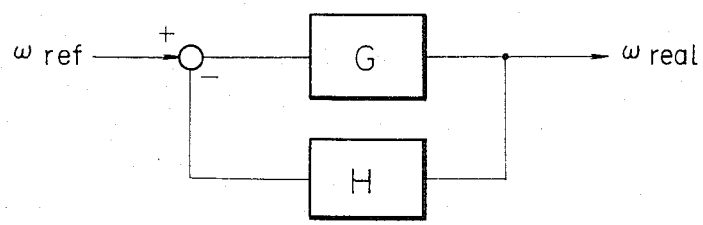
FIG. 2 is a simplified diagram representing a velocity control system of the arrangement shown in FIG. 1.

The velocity control system of the control circuit shown in FIG. 1 may be represented by a simple diagram shown in FIG. 2. In FIG. 2, G denotes the gain of the circuitry, and H the feedback gain of the motor velocity. As well known in the art, the relationship between a desired velocity $\omega$ref and an actual velocity $\omega$real is expressed as:

$$\omega\text{real} = \frac{G}{1 + GH} \omega\text{ref} \qquad \text{Eq. (1)}$$

Where $G >> 1$, Eq. (1) is rewritten as $\omega\text{real} \approx 1/H\omega\text{ref}$. The motor velocity, therefore, can be adjusted by varying the feedback gain of the motor velocity H or the desired velocity $\omega$ref. In FIG. 1, the connection of the velocity adjuster 18 to the output of the velocity signal generator 22 corresponds to changing the feedback gain H while the connection of the velocity adjuster 18' to the output of the reference signal generator 20 is for changing the desired velocity $\omega$ref.

Figure 3:
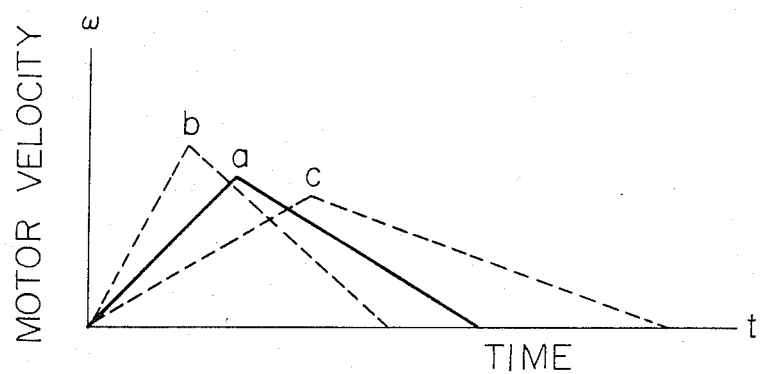
FIG. 3 is a plot indicating the relationship between an angular velocity $\omega$ and an operation time t of a servomotor.

When the desired velocity $\omega$ref or the feedback gain H is varied as mentioned above, the relationship between an angular velocity $\omega$ of the motor and an operation time t is varied as plotted in FIG. 3. The function of each velocity adjuster 18 or 18' is to set up a desired velocity profile a, b or c shown in FIG. 2 by eliminating various inaccuracy factors which affect the angular speed $\omega$ of the motor.

Figure 4:
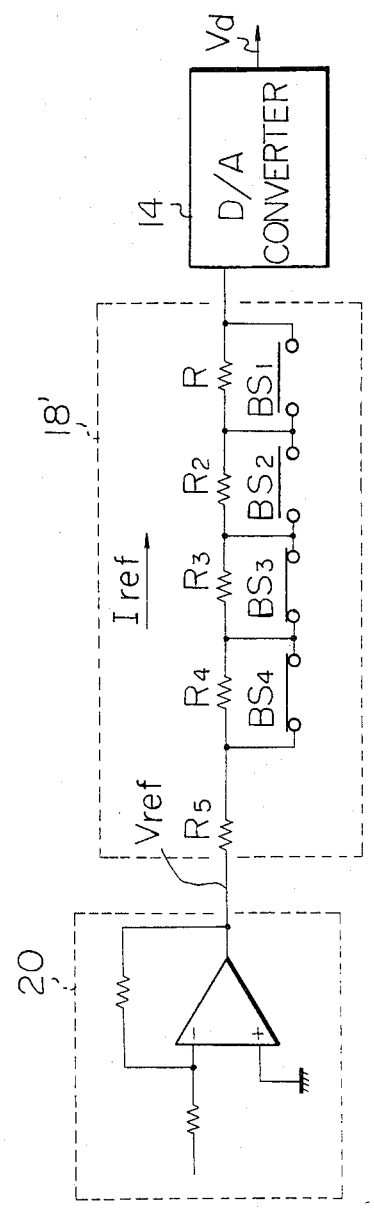
FIGS. 4 and 5 are circuit diagrams showing details of two velocity adjuster sections of FIG. 1, respectively.

Referring to FIG. 4, the velocity adjuster 18' connected between the reference signal generator 20 and the D/A converter 14 is illustrated in detail. The velocity adjuster 18' is designed to vary the output resistance of the output voltage Vref of the reference signal generator 20 and, therefore, the current Iref fed to the D/A converter, thereby adjusting the operating velocity of the motor. As shown, the velocity adjuster 18' comprises resistors $R_1$–$R_4$ for velocity adjustment, a standard resistor $R_5$ and short bars or like elements $BS_1$–$BS_4$ adapted to short-circuit or open the resistors $R_1$–$R_4$, respectively. Assuming that R is a resistance, the resistors $R_1$–$R_4$ have resistances which are multiplied as $R_1 = R$, $R_2 = 2R$, $R_3 = 2^2 R$ and $R_4 = 2^3 R$. Suppose that count "15" indicates a case wherein all the short bars $BS_1$–$BS_{14}$ are opened, and count "0" when all the short bars $BS_1$–$BS_4$ are closed. Counts "14" to "1" are provided by various combinations of open and closed positions of the short bars $BS_1$–$BS_{14}$. This is shown in Table in which $\overline{O}$ stands for OPEN and S stands for SHORT-CIRCUIT.

TABLE

| COUNT (n) | $BS_4$ | $BS_3$ | $BS_2$ | $BS_1$ | Iref |
|---|---|---|---|---|---|
| 15 | $\overline{O}$ | $\overline{O}$ | $\overline{O}$ | $\overline{O}$ | $V\text{ref}/(R_5 + 15R) \approx \left(1 - 15\frac{R}{R_5}\right) \frac{V\text{ref}}{R_5}$ |
| 14 | $\overline{O}$ | $\overline{O}$ | $\overline{O}$ | S | $V\text{ref}/(R_5 + 14R) \approx \left(1 - 14\frac{R}{R_5}\right) \frac{V\text{ref}}{R_5}$ |

TABLE-continued

| COUNT (n) | BS$_4$ | BS$_3$ | BS$_2$ | BS$_1$ | Iref |
|---|---|---|---|---|---|
| 13 | $\overline{O}$ | $\overline{O}$ | S | $\overline{O}$ | $V_{ref}/(R_5 + 13R) \simeq \left(1 - 13\frac{R}{R_5}\right)\frac{V_{ref}}{R_5}$ |
| 12 | $\overline{O}$ | $\overline{O}$ | S | S | $V_{ref}/(R_5 + 12R) \simeq \left(1 - 12\frac{R}{R_5}\right)\frac{V_{ref}}{R_5}$ |
| — | — | — | — | — | — |
| 0 | S | S | S | S | $V_{ref}/R_5 = \frac{V_{ref}}{R_5}$ |

Thus, it will be seen that there holds an equation:

$$I_{ref} = V_{ref}/(R_5 + nR) \qquad \text{Eq. (2)}$$

Assuming $R_5 \gg R$, then $$I_{ref} \approx (1 - nR/R_5)V_{ref}/R_5 \qquad \text{Eq. (3)}$$

It will be apparent from the Eq. (3) that the input current Iref varies stepwisely at the equal rate of change $R/R_5$ in accordance with the count n. This implies that the velocity of the servomotor varies stepwisely substantially at the same interval in proportion to the input current Iref; for example, the velocity is adjustable in $2^N$ steps by the combination of N resistor elements and parts for short-circuiting the resistor elements. In the illustrated embodiment, the velocity can be adjusted in 16 successive steps depending upon the positions of the short bars BS$_1$-BS$_4$.

Figure 5:
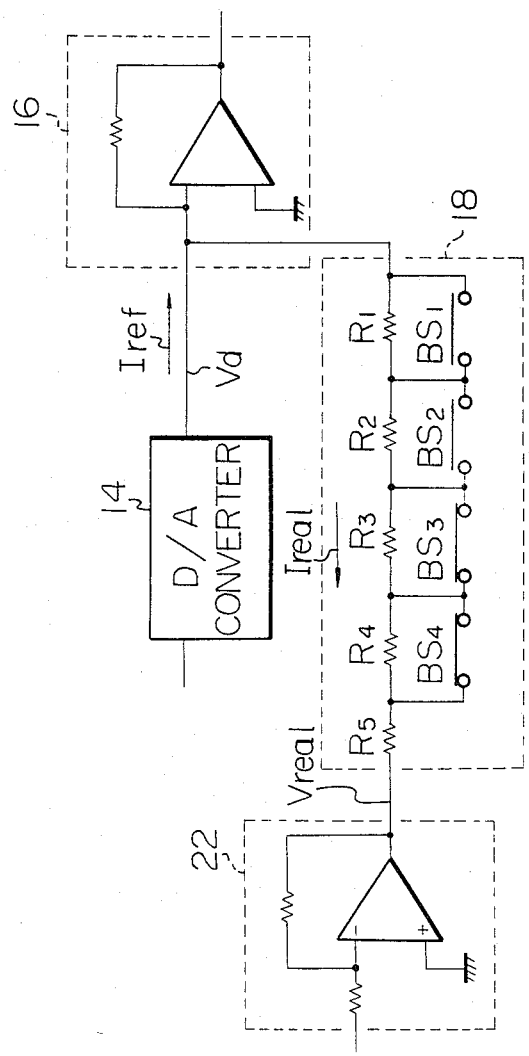

The other velocity adjuster 18 connected with the velocity signal generator 22 is shown in FIG. 5. Details of the construction and operation of the velocity adjuster 18 is essentially the same as those of the velocity adjuster 18' and, therefore, description thereof will be omitted for the sake of simplicity.

It will be understood from the above description that in a general servosystem control such as the one having the velocity adjusters 18 and 18', arranging the short bars BS$_1$-BS$_4$ into a connector configuration facilitates the adjustment of the operation time during services. This simply requires connecting an external checker or adjusting device to the connector-like short bars BS$_1$-BS$_4$.

Figure 6:
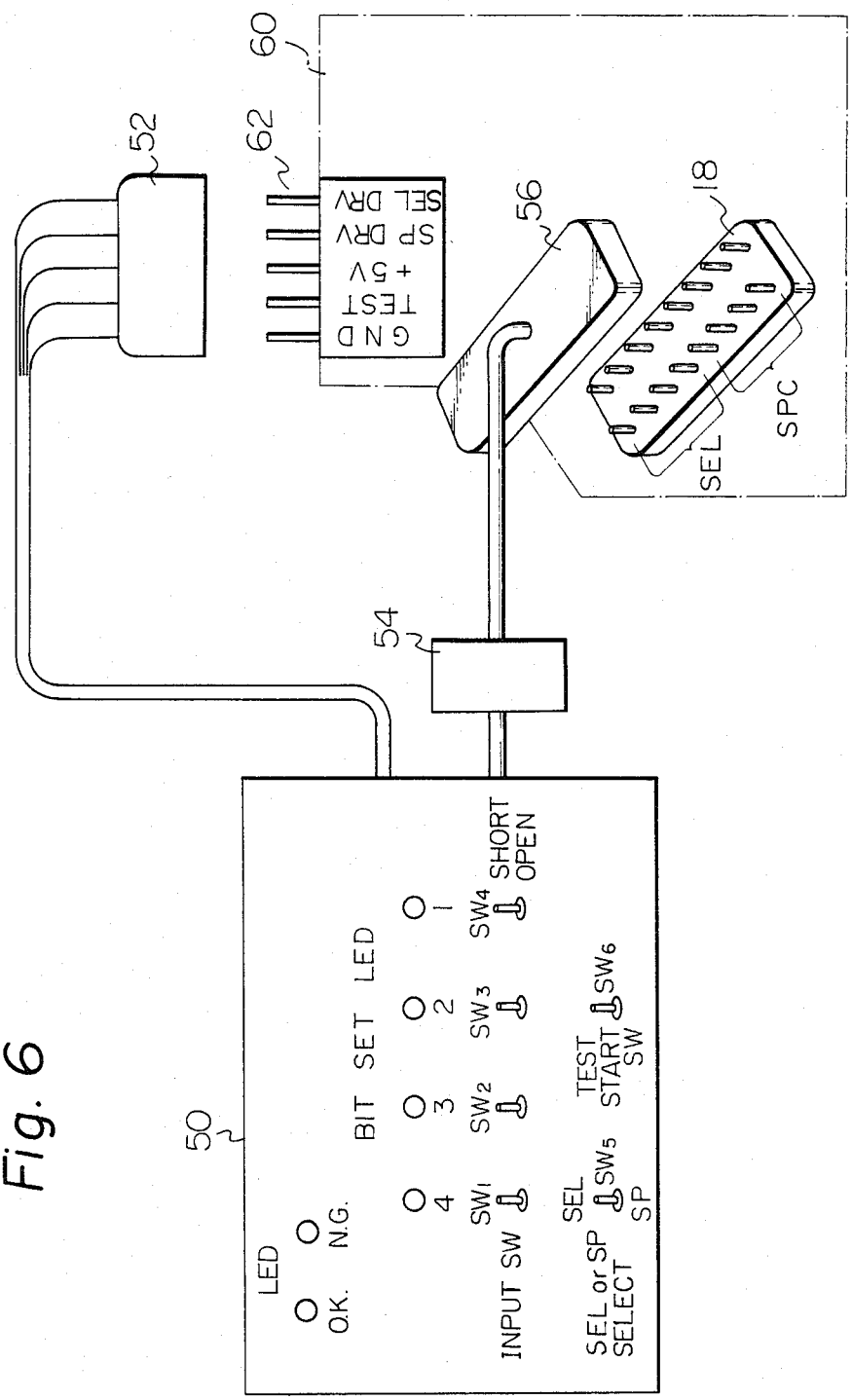
FIG. 6 is a schematic view of an apparatus of the present invention which is applied to a servomotor of a printer.

Referring to FIG. 6, there is shown an operation time adjusting apparatus or external checker 50 of the present invention. The external checker 50 is applied to a printer 60 which includes a servomotor control circuit provided with velocity adjusters (referred to as "bit setters" hereinafter) 18 and 18'. As shown, the external checker 50 comprises a first connector 52, a reed switch array 54 and a second connector 56. The first connector 52 is connected to short pins 62 of the printer 60 at the time of adjustment of the operation time. The short pins 62 may include a character selection drive pin (SEL DRV), a space drive pin (SP DRV), a +5 V pin (P5V) for powering the checker 50 from the printer 60 side, a test pin (TEST) and a ground pin (GND) for setting up a common ground level in both the printer 60 and checker 50. It will be apparent that the +5 V pin is needless if the checker 50 has a power source thereinside.

Figure 7:
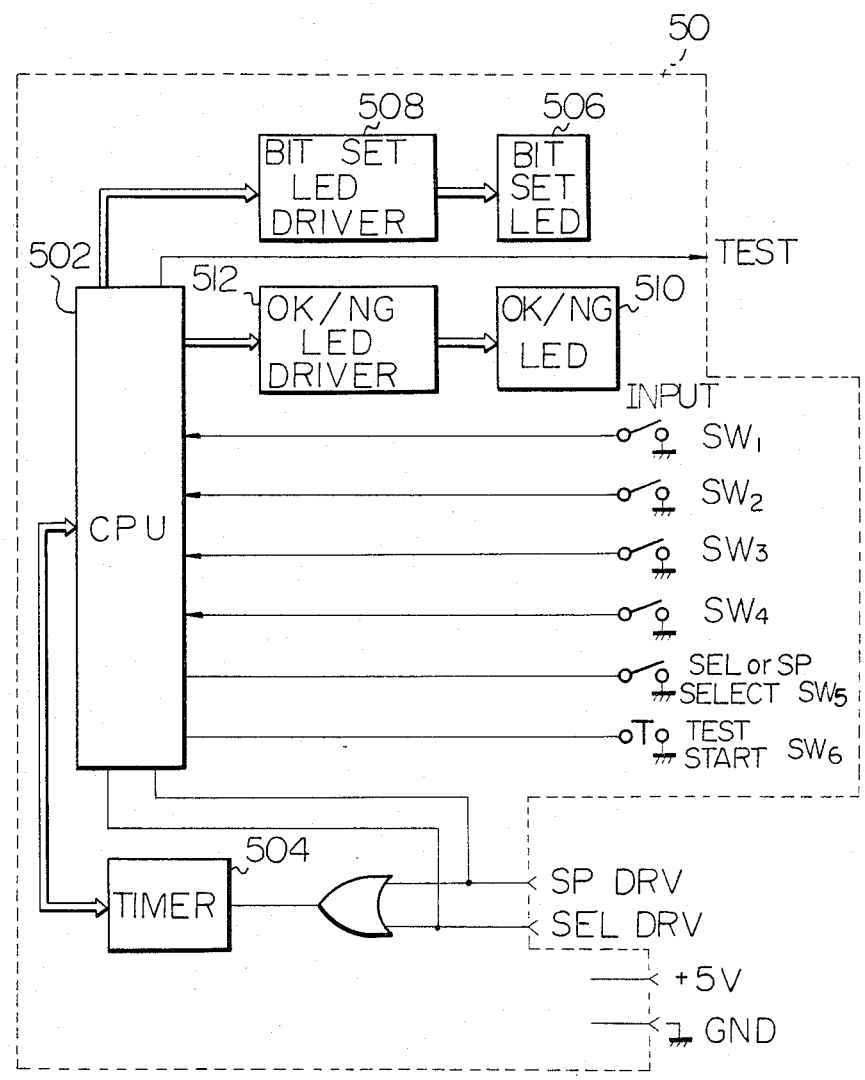
FIG. 7 is a block diagram of the apparatus shown in FIG. 6.
Figure 8A:
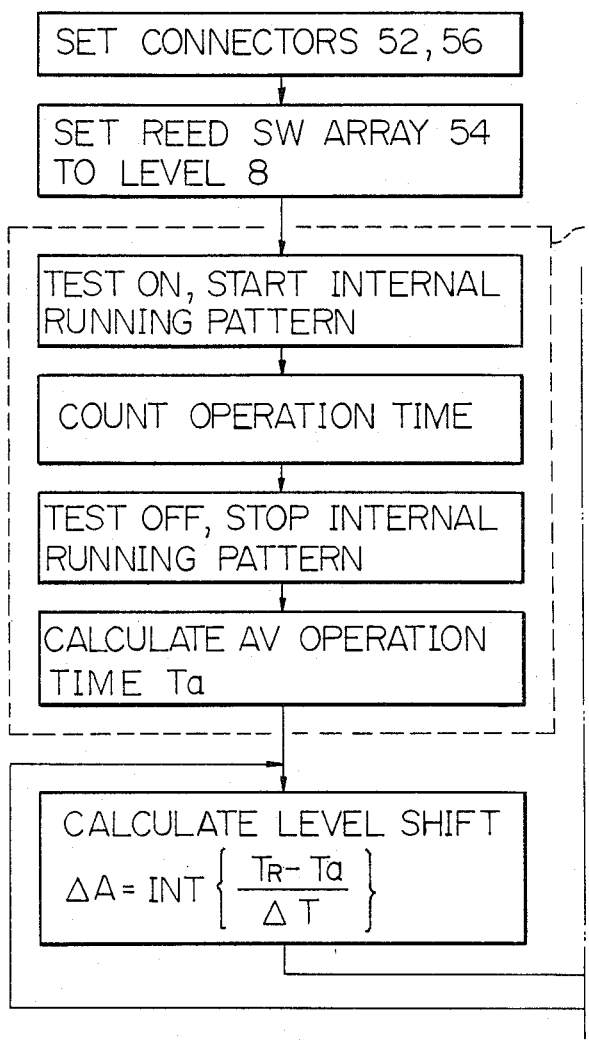
FIGS. 8a and 8b are flowcharts demonstrating operations in accordance with the present invention.
Figure 8B:
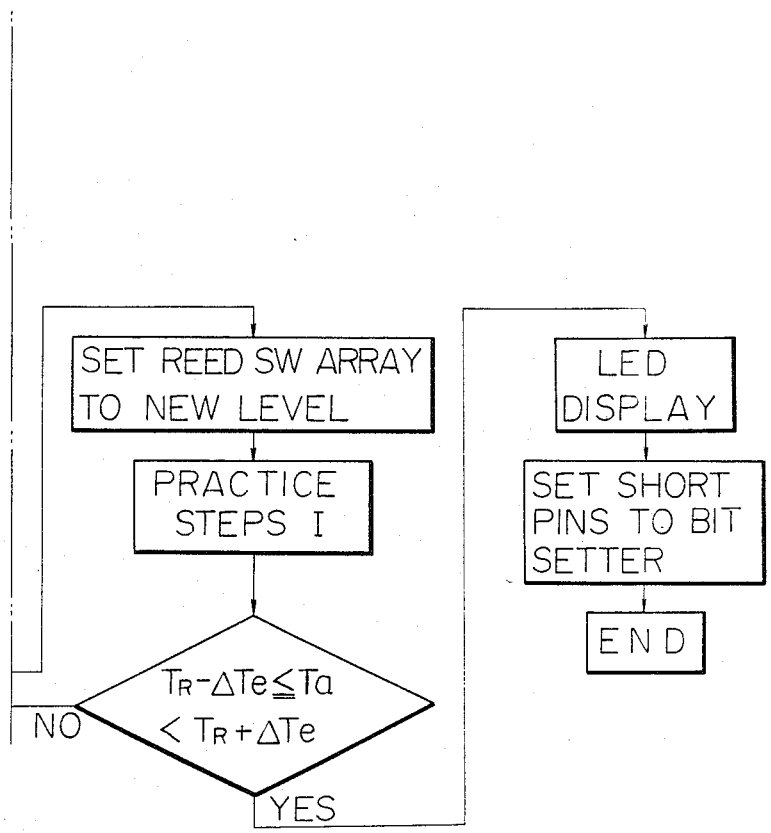

As shown in FIG. 7, the checker 50 includes a CPU 502, a timer 504, a bit (short bar) set LED 506, a bit set LED driver 508, an OK/NG LED 510, an OK/NG LED driver 512, input switches SW$_1$-SW$_4$, a character selection/space changeover switch SW$_5$ and a test start switch SW$_6$. The velocity of the servomotor in the printer 60 is adjusted according to the flow shown in FIG. 8, either during assembly at the production stage or during replacement of the servomotor or the printed circuit board in the field.

First, the first and second connectors 52 and 56 are coupled with the short pins 62 and bit setter 18, respectively. This causes the bit setter 18 to be set to, for example, a level 8 (center level) via the reed switch array 54 according to a predetermined program of the checker 50. Naturally, the input switches SW$_1$-SW$_4$ may be manually operated to so set the bit setter 18, instead of relying on the reed switch array 54 which abides by the checker program. When the test start switch SW$_6$ is turned on, a predetermined internal running pattern is initiated so that a character selecting action occurs if the SEL/SPC selector switch SW$_5$ is on the SEL side or a spacing action if the switch SW$_5$ is on the SPC side. It will be noted that such character selecting and spacing actions may be effected in succession depending upon the program.

As shown in FIG. 9, the actions occur intermittently as indicated by times $T_1, T_2 \ldots T_N$. The total operation time T is expressed as:

$$T = \sum_{i=1}^{N} T_i \qquad \text{Eq. (4)}$$

An average operation time Ta per step is produced by $$T_a = \frac{T}{N} = \frac{\sum_{i=1}^{N} T_i}{N} \qquad \text{Eq. (5)}$$

These operation times T and Ta are counted by the CPU 502 installed in the checker 50. From the resulting average operation time Ta, an amount of shift ΔA is calculated:

$$\Delta A = INT\left\{\frac{T_R - T_a}{\Delta T}\right\} \qquad \text{Eq. (6)}$$

where $T_R$ is a reference operation time and ΔT is an amount of shift per level. As indicated in FIG. 10, supposing an allowable range of operation times $T_R \pm \Delta T_e$, the shift ΔT lies between $T_R - \Delta T_e$ and $T_R + \Delta T_e$.

In this manner, a shift ΔA is obtained. Then, the reed switches of the reed switch array 54 is set to another level and, again, an average operation time Ta is calculated as indicated by a block I in FIG. 8. Thus, "OK" of the OK/NG LED 510 is turned on when the average operation time Ta lies within the range:

$$T_R - \Delta Te \leq Ta < T_R + \Delta Te \qquad \text{Eq. (7)}$$

where ΔTe is an allowable operation time from the reference operation time. Under this condition, the short pins are coupled with the bit setter 18 which corresponds to the energized LED. The servomotor is now fully adjusted to the desired velocity. For accuracy purpose, such a procedure may be repeated a plurality of times. If the average operation time Ta does not satisfy the Eq. (7), a shift level ΔA is calculated again, the reed switch array 54 is set to another level, and a new average operation time is calculated.

Figure 11:
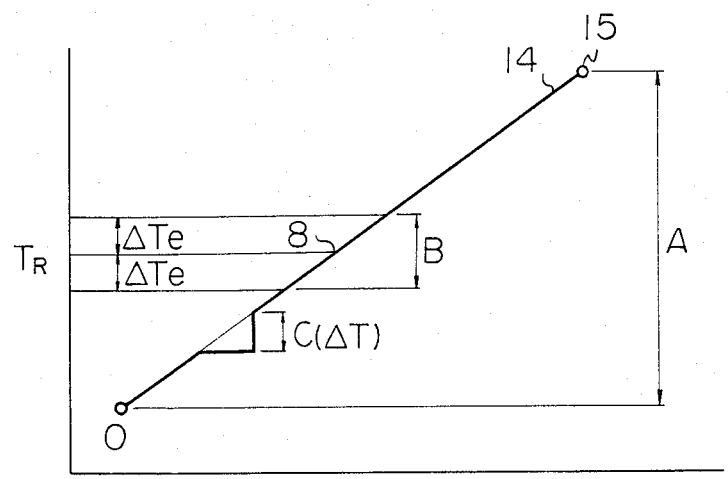
FIGS. 11 and 12 are diagrams illustrating operations of the present invention.
Figure 12:
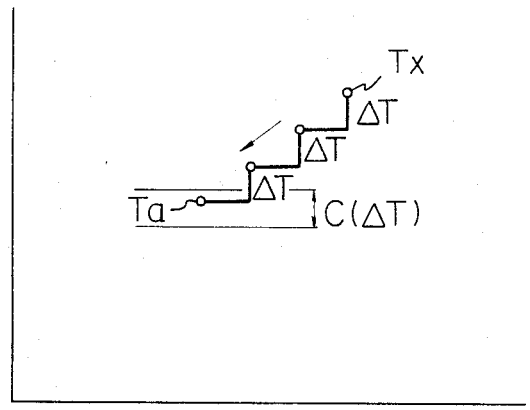

The procedure described so far is illustrated in FIGS. 11 and 12. In FIG. 11, A designates an inaccuracy range of operation time before adjustment such as when the reed switch array 54 is fixed to the level 8, $T_R$ the operation time at the level 8, B an allowable range of operation times, and C an amount of shift ΔT per level. FIG. 12 shows a case in which three times of adjustment were performed in succession in order to satisfy the Eq. (7); the level was shifted three times from the initial operation time Tx for a time ΔT at a time, until the final operation time Ta entered the allowable range C of operation times.

It will be seen from the above that the external checker in accordance with the present invention is capable of readily correcting an error in the operation time of a servosystem which is attributable to the inaccuracy in the characteristics of a servomotor, inaccuracy in the circuit elements of a printed circuit board, etc. The adjustment may be carried out either in a factory or at the site of use of the printer.

The operation time adjusting apparatus of the present invention has been shown and described as taking the form of an external checker which is operated at the outside of a servosystem. Alternatively, the function of the checker may be furnished with inside the mechanism inclusive of the servosystem itself, which is the servomotor velocity control device in the above-described embodiment, with a view to facilitating the adjustment to a remarkable extent. Such an alternative construction will be described with reference to FIGS. 13–17.

Figure 13A:
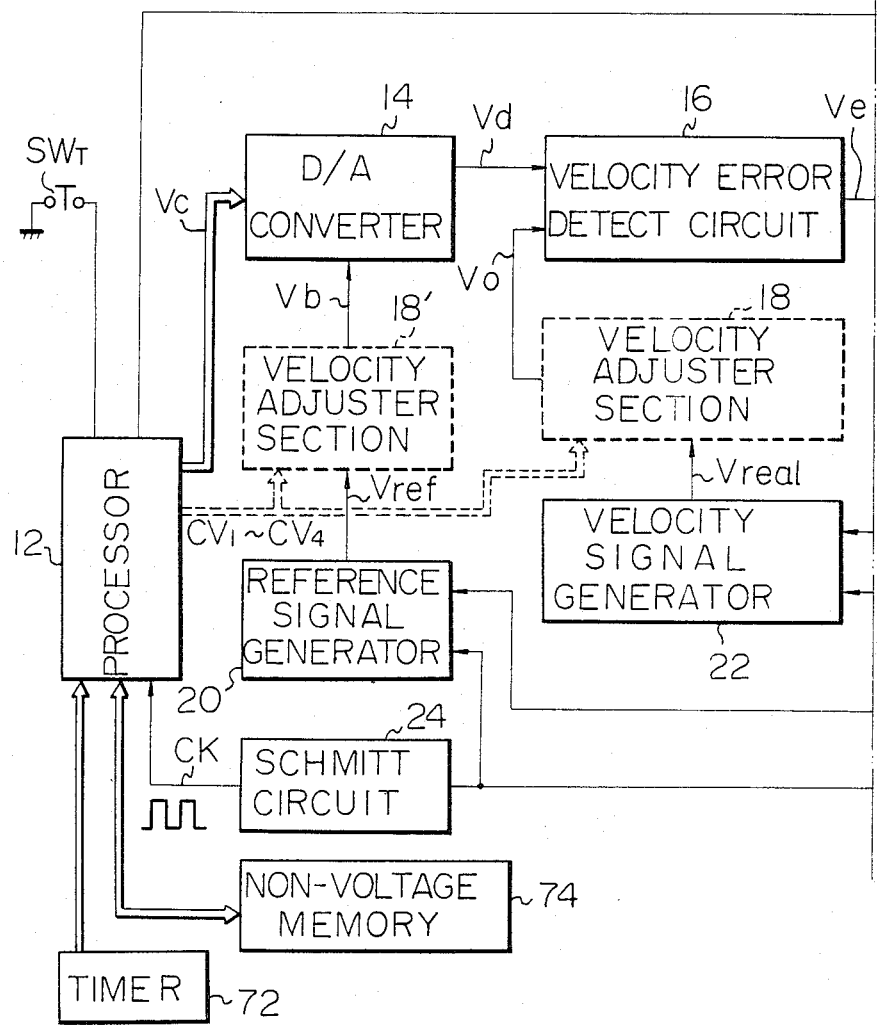
Figure 13B:
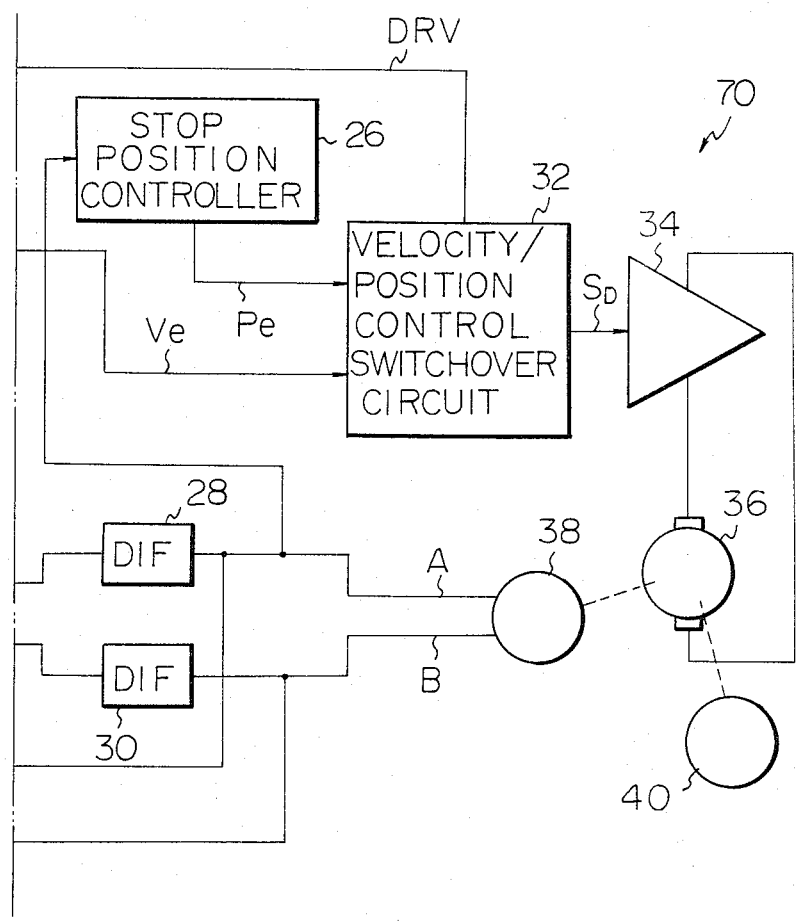
Figure 14:
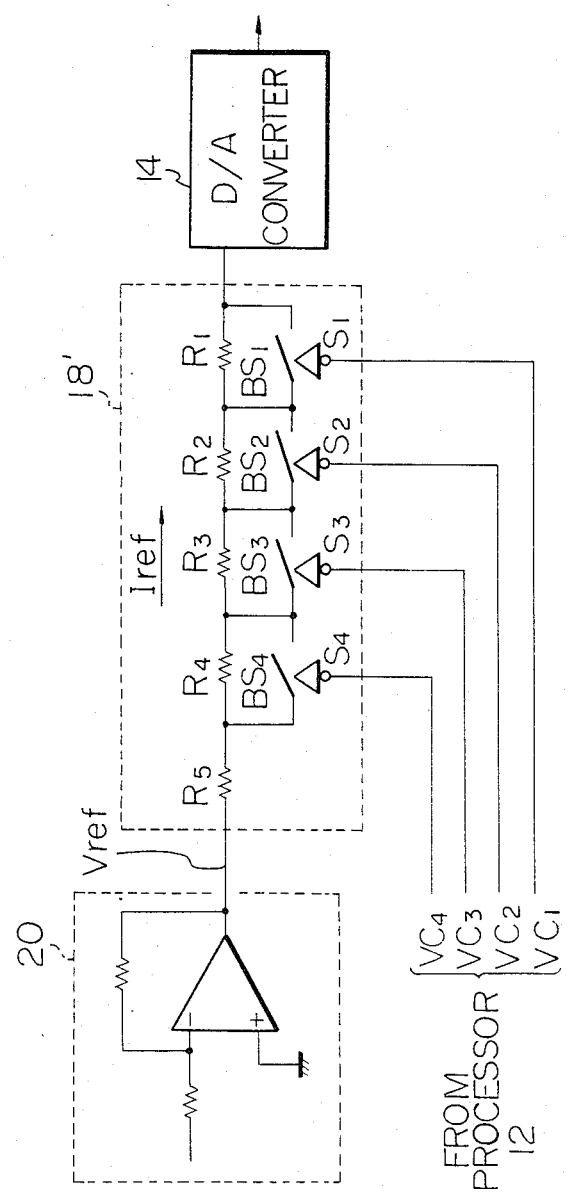
Figure 15:
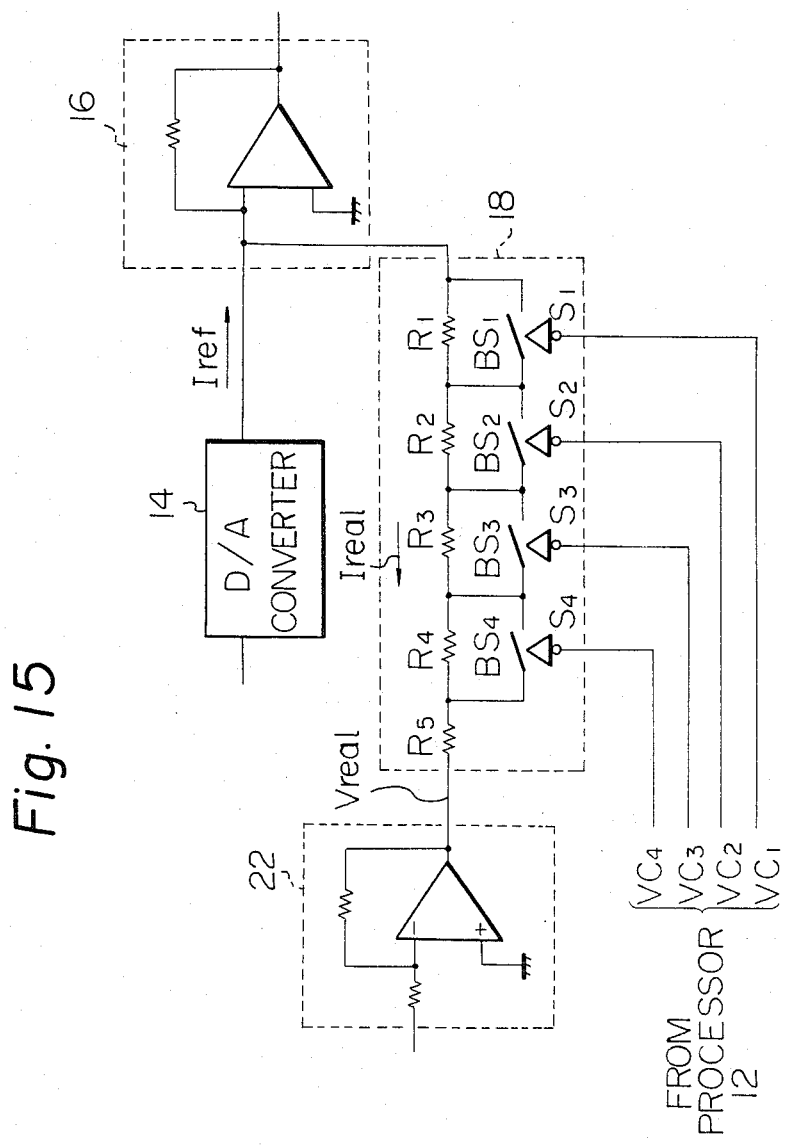

Referring to FIGS. 13–17, a self-adjustable velocity control device for a servomotor is illustrated with its structural elements common to those of FIGS. 1, 4 and 5 designated by the same reference numerals. Unlike the case of FIG. 1, the servomotor and its associated control system 70 in FIG. 13 are additionally provided with a test switch SW$_T$, a timer 72, a non-volatile memory 74 and signal lines CV$_1$–CV$_4$ leading to the adjusters 18 and 18'. Each of FIGS. 14 and 15 differs from FIG. 4 or 5 in that analog switches S$_1$–S$_4$ are employed to drive the short bars BS$_1$–BS$_4$, respectively.

Figure 16B:
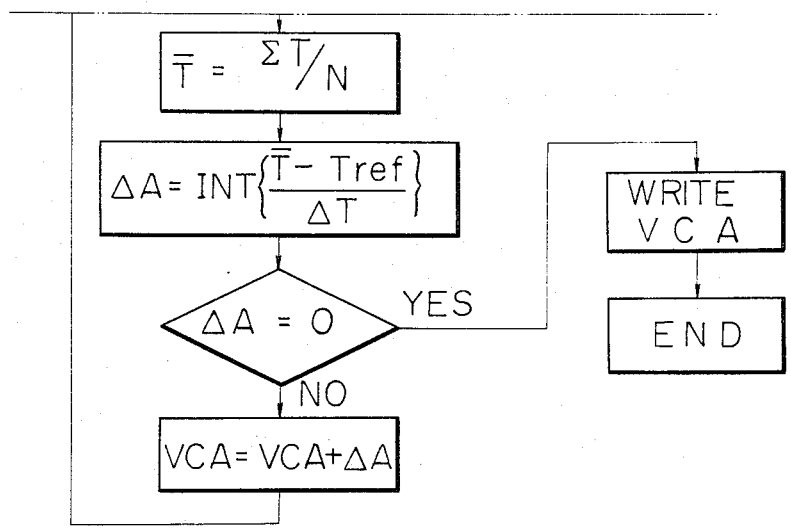
Figure 17:
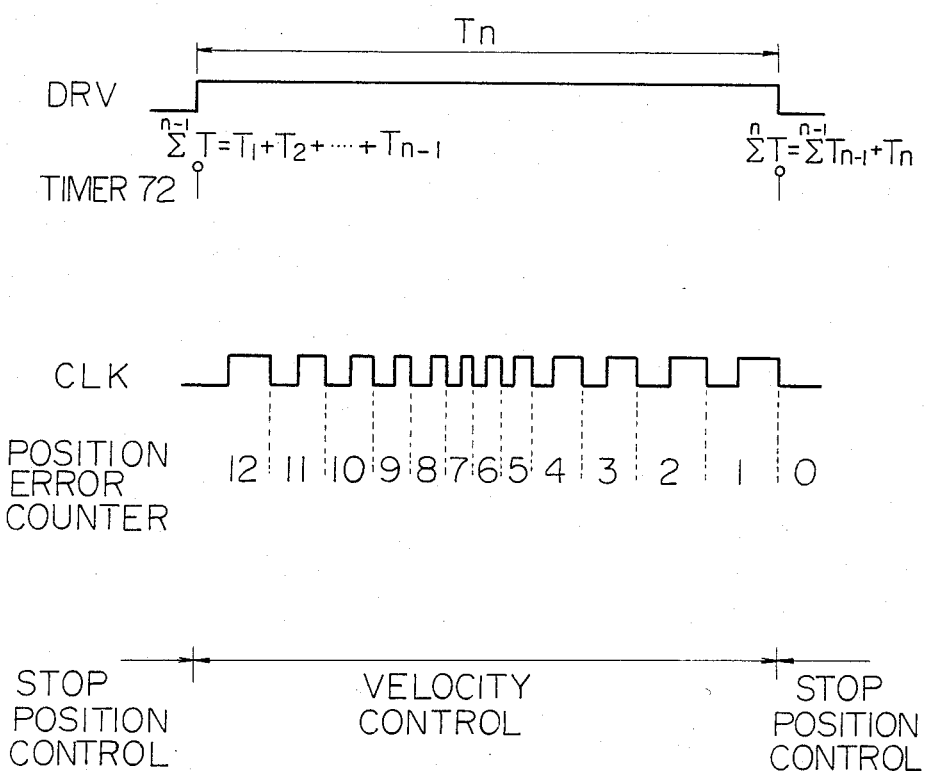
FIG. 17 is a timing chart also showing operations of the apparatus of FIGS. 13–15.

Referring also to FIGS. 16 and 17, when the test switch SW$_T$ shown in FIG. 13 is turned on, a velocity control adjust value V$_{CA}$ is read out of the non-volatile memory 74 and fed by the signal lines CV$_1$–CV$_4$ to the analog switches SW$_1$–SW$_4$. This moves the motor back to its home position and then clears the timer 72. Thereafter, a DRV signal coupled from the processor 12 to the velocity/position control switchover 32 is made high or "H" to drive the servomotor 36 while, at the same time, the timer 72 is triggered to control the velocity of the servomotor 36. As the motor 36 reaches a point near the end of a desired distance, the DRV signal is made low or "L" to control the stop position of the motor this time 36 and the timer 72 is stopped. This procedure is repeated "N" times to obtain the average operation time $\overline{T}$:

$$\overline{T} = \Sigma T / N \qquad \text{Eq. (8)}$$

Then, a shift ΔA from the current adjust value for the adjustment to the desired operation time is produced:

$$\Delta A = INT\left\{\frac{\overline{T} - Tref}{\Delta T}\right\} \qquad \text{Eq. (9)}$$

If the shift ΔA is zero, a new velocity control adjust value V$_{CA}$ is written into the memory 74 and the adjustment is finished. In response to a non-zero shift ΔA, a new velocity control adjust value is obtained by the addition V$_{CA}$+ΔA.

It will be seen that the second embodiment shown and described cuts down the cost for adjustment either in the factory or in the field.

Various modifications will become possible for those skilled in the art after receiving the teachings of the present disclosure without departing from the scope thereof.

What is claimed is:

1. A method of adjusting an operation time for performing a predetermined operation of a servosystem into a predetermined allowable range, comprising the steps of:
   (a) driving the servosystem for performing the operation according to a predetermined operation pattern;
   (b) calculating an average operation time of the servosystem;
   (c) calculating an amount of level shift from the resulting average operation time;
   (d) shifting the operation time of the servosystem stepwisely during a given time interval based on the resulting amount of level shift;
   (e) re-calculating an average operation time of the servosystem after the shift in step (d); and
   (f) repeating the calculation of an average operation time until the average operation time is brought into the allowable range.

2. An apparatus for adjusting an operation time for performing a predetermined operation of a servosystem into a predetermined allowable range, comprising:
   means for calculating an average operation time of the servosystem;
   means for calculating an amount of level shift from the resulting average operation time;
   means for stepwisely shifting the operation time of the servosystem during a given time interval, based on the resulting amount of level shift; and
   means for re-calculating an average operation time after the shift;
   whereby the average operation time is controlled into the allowable range.

3. An apparatus for adjusting a velocity of a servomotor in a printer into a predetermined allowable range, comprising:

means for shifting a velocity of the servomotor stepwisely during a given predetermined time interval;

means for driving the servomotor according to a predetermined operation pattern;

means for instructing the shifting means to stepwisely shift the velocity level;

means for commanding the printer to start and subsequently stop the operation pattern; and means for detecting an average velocity of the servomotor.

4. An apparatus as claimed in claim 3, further comprising means for displaying the velocity level.

5. A servosystem comprising:

a servo motor;

drive means for driving the servo motor;

control means for controlling the drive means to drive the servo motor to perform a predetermined operation;

timer means for measuring a length of operation time required to perform the operation; and adjustment means responsive to the timer means for adjusting a predetermined parameter of the drive means affecting a drive velocity of the servo motor such that the operation time is adjusted to substantially a predetermined length of time.

6. A servosystem as claimed in claim 5, further comprising:

housing means in which the servo motor and drive means are disposed; and test apparatus means, the control means, timer means and adjustment means being component elements of the test apparatus means, the test apparatus means being detachably connectable with the housing means.

7. A servosystem as claimed in claim 5, further comprising a printer, the servo motor and drive means being component elements of the printer for driving a movable element thereof.

8. A servosystem as claimed in claim 7, further comprising test apparatus means, the control means, timer means and adjustment means being component elements of the test apparatus means, the test apparatus means being detachably connectable with the printer.

9. A servosystem as claimed in claim 5, further comprising a printer having a housing, the servo motor and drive means being disposed in the housing for driving a movable element of the printer, the control means, timer means and adjustment means being permanently mounted in the housing.

10. A servosystem as claimed in claim 5, in which the predetermined parameter is a feedback gain of the drive means.

11. A servosystem as claimed in claim 5, in which the predetermined parameter is a command velocity of the drive means.

12. A servosystem as claimed in claim 5, in which the adjustment means comprises variable resistor means for adjusting the predetermined parameter.

13. A servosystem as claimed in claim 12, in which the variable resistor means comprises a plurality of resistors and switch means connected in parallel with the resistors respectively for selectively shorting the resistors.

14. A servosystem as claimed in claim 5, in which the control means comprises storage means for storing a program which controls the drive means to perform the predetermined operation.

15. A servosystem as claimed in claim 5, in which the adjustment means is constructed to adjust the predetermined parameter in steps.

16. A servosystem as claimed in claim 15, in which the adJustment means comprises means for calculating a number of steps required to adjust the operation time to the predetermined length of time and adjusting the predetermined parameter by the number of steps.

17. A servosystem as claimed in claim 16, in which the timer means and adJustment means are constructed to repeatedly measure the operation time, compare the operation time with the predetermined length of time and adjust the predetermined parameter until the operation time is within a predetermined time range which contains the predetermined length of time.

* * * * *